United States Patent [19]

Santhanam

[11] Patent Number: 5,536,871
[45] Date of Patent: Jul. 16, 1996

[54] POURABLE LIQUID POLYESTERAMIDE RHEOLOGICAL ADDITIVES AND THE USE THEREOF

[75] Inventor: Mahalingam Santhanam, East Windsor, N.J.

[73] Assignee: Rheox, Inc., Hightstown, N.J.

[21] Appl. No.: 511,084

[22] Filed: Aug. 3, 1995

Related U.S. Application Data

[62] Division of Ser. No. 272,458, Jul. 11, 1994, Pat. No. 5,510,452.

[51] Int. Cl.$^6$ .................. C07C 69/003; C07C 233/18
[52] U.S. Cl. ............................. 560/196; 564/153
[58] Field of Search ............... 560/196; 564/153; 528/291, 295.3

[56] References Cited

U.S. PATENT DOCUMENTS

| | | | |
|---|---|---|---|
| 4,107,061 | 8/1978 | Sturwold et al. | 564/153 |
| 4,734,523 | 3/1988 | Hofinger et al. | 560/196 |
| 5,085,699 | 2/1992 | Hutter | 525/437 |
| 5,091,572 | 2/1992 | Speranza et al. | 564/153 |
| 5,349,011 | 9/1994 | Reichert et al. | 528/295.3 |

*Primary Examiner*—D. R. Wilson
*Attorney, Agent, or Firm*—Michael J. Cronin

[57] ABSTRACT

A liquid, pourable rheological additive expecially useful for thickening liquid organic compositions which comprises the reaction product of a defined polyalkoxylated nitrogen-containing compound, polycarboxylic acid and a liquid diamine. The additive, which exists in a pourable, pumpable form at up to a 100% rheologically active composition, exhibits excellent thickening efficiency for systems including inks, epoxies, polyesters, paints, greases and other systems, including ease of dispersibility, without adversely affecting gloss. The additive operates by both an associative and a reaction mechanism to provide rheological viscosity properties to such systems, and is also similarly useful for aqueous systems.

7 Claims, No Drawings

POURABLE LIQUID POLYESTERAMIDE RHEOLOGICAL ADDITIVES AND THE USE THEREOF

This is a division of application Ser. No. 08/272,458, filed Jul. 11, 1994, now U.S. Pat. No. 5,510,452.

FIELD OF INVENTION

The present invention relates to an improved rheological additive for organic and other systems which is in a pourable, liquid form at ambient temperatures and which need not contain a solvent to achieve its liquid state. Such an additive provides improved viscosity control and a variety of other rheological properties to many types of organic and water-based systems without adverse environmental effects. The present invention also relates to a thickened composition or system containing the new rheological control additive.

DESCRIPTION OF THE PRIOR ART

The art has constantly sought materials, generally referred to as thickeners, thixotropes, rheological additives or rheological control agents, which are used to control the rheological properties of various liquid compositions including inks, epoxies, paints, coatings, polyesters and greases. It has been generally recognized that to be effective, especially for coating compositions, such rheological control agents must provide proper viscosity and rheological characteristics to the systems in which they are used. In this regard, organophilic clays have shown to be useful to thicken various organic and solvent-based compositions. Exemplary U.S. Patents which describe various kinds of organically-modified clays are U.S. Pat. Nos. 4,208,218; 4,410,364; 4,412,018; and 4,517,112. Fumed silica and precipitated silica have also been used to thicken certain types of organic compositions.

There are, however, drawbacks with the use of organically modified clays and silicaceous materials for thickening organic compositions. Since both organically modified clays and fumed silica exist in solid particulate form, these materials generally must be added during the grind stage of manufacture of the compositions to be thickened. Additionally, dusting problems are associated with the use of such organically-modified clay and silicaceous products during manufacturing procedures. In addition, the use of these types of additives can lead to a loss of gloss in the cured coating. Fumed silica in particular is dusty and difficult to handle because of its low bulk density. Furthermore, these additives exhibit extremely rapid recovery following shear, thereby limiting the leveling or smoothness of the applied composition. Organoclays are sometimes sold as gels, where the organoclay is dispersed in an organic liquid, in order to avoid the need to use a solid thickener.

It has long been known in the art to use various materials as thickening compositions to thicken aqueous systems. Aqueous systems include both water-based and latex-based paints, coatings, inks, construction materials, cosmetics, and wood stains utilized in various aspects of a civilized industrial society. Depending on the composition of the aqueous system, the products made with these thickeners can be useful as decorative and protective coatings, paper coatings, cosmetics and personal care items, adhesives and sealants, inks, petroleum drilling fluids, joint compounds, and the like.

Many aqueous thickeners are known, including natural, modified-natural, and synthetic. Natural thickeners, for instance, include casein and alginates. Modified-natural thickeners include modified cellulosic, including methyl cellulose, hydroxyethyl cellulose, hydroxypropyl cellulose, and carboxymethyl cellulose. These products vary in their thickening efficiency and flow and leveling properties. Synthetic thickeners in recent years have assumed increased importance, particularly in the viscosity control of aqueous and latex paints and coatings. The synthetic thickener serves several roles in aqueous systems. In latex and aqueous paints and coatings, for instance, the thickener provides improved stability and pigment suspension, and improved application properties.

Synthetic rheological thickeners include various acrylic polymers and maleic anhydride copolymers. Two patents issued to Rheox Inc., a subsidiary of NL Industries, Inc., describe a family of polyurethane thickening compositions. These patents, U.S. Pat. Nos. 4,499,233 and 5,023,309, describe these synthetic thickeners as the polyurethane reaction product of polyisocyanates, polyether polyols, and modifying agents which contain at least two active hydrogen moieties, terminated by a capping agent. One type of synthetic thickener used extensively in commercial applications is a low molecular weight polyurethane characterized by hydrophobic groups interconnected by hydrophilic polyether groups, and is disclosed in Rohm & Haas U.S. Pat. Nos. 4,079,028 and 4,155,892.

One similar type of synthetic thickener is a water-soluble, thermoplastic organic polymer having a number of monovalent hydrophobic groups incorporated in the internal portion of the polymer molecule. U.S. Pat. Nos. 4,496,708 and 4,426,485, issued to Union Carbide Corporation, describe such thickeners as water-soluble comb polymers.

The above-described rheological additives, useful in aqueous systems, have been often referred to by the term "associative" thickeners. Associative thickeners are so called because the mechanism by which they thicken may involve associations between species in the thickener molecules and other surfaces, either on other molecules of the thickener, or on molecules in the system to be thickened.

Some of the problems of use, dispersibility and reduction of gloss associated with the solid particulate type of thickeners such as silica are overcome with the use of polyamide rheological additives. For example, U.S. Pat. No. 4,778,843 describes a solid polyamide rheological additive especially designed for organic solvent-based compositions, which comprises the reaction product of polycarboxylic acid, an active hydrogen compound of a specified carbon chain length and structure, and a monocarboxylic acid capping agent, wherein the additive exhibits excellent efficiency and dispersibility, and is effective when predispersed in an organic solvent. Recently-allowed U.S. Pat. No. 5,349,011 describes a polyamide-ester rheological additive, especially for organic solvent-based compositions, which comprises the reaction product of polycarboxylic acid, an active hydrogen composition of a specified structure, an alkoxylated polyol, and a monocarboxylic acid capping agent. Said additive exhibits excellent efficiency and ease of dispersibility for aliphatic solvent-based coating compositions, and is effective when dispersed into a solvent.

U.S. Pat. No. 5,034,444 describes an anti-sag additive for non-aqueous coating compositions which is the reaction product of an alkoxylated aliphatic nitrogen-containing compound, an aliphatic diamine or mixtures thereof, and an organic polycarboxylic anhydride or acid, an alkanediol polyepoxide ether or mixtures thereof. The additive provides excellent anti-sag and storage stability properties, particularly for high solids coating compositions, without causing a significant increase in viscosity.

U.S. Pat. No. 4,072,641 describes polyamide resins useful as flexographic ink vehicles which are prepared by reacting polymeric fatty acids, an alkylene diamine, a mono amino alcohol which is neither branched nor ethoxylated, and a chain-stopping agent which agent, includes a particular branched chain monocarboxylic fatty acid, which resin is liquid at room temperature. The resultant polyamide resin is resistant to gelling during storage.

Levels of rheological thickening additives varying between 0.1% and about 10%, based on the total weight of the system to be thickened, have been found to be useful. The aforesaid associative thickeners are in most cases highly efficient viscosity improvers, even though they have low to middle range molecular weight. They are not sensitive to degradation. They are versatile, in that not only do they thicken virtually unlimited types of systems, but they also impart many beneficial auxiliary properties. In certain paints and coatings, especially, they not only thicken, but in certain cases also provide superior flow and leveling properties, as well as excellent viscosity control under both low and high shear conditions.

Disadvantages of Current Systems

Thickeners for organic systems based on polyamide and similar chemistry are prepared in solid form, and have been produced and used as thickeners in dry, solid form. Dispersion is critical to activation of the thickener and thickener efficiency is a direct function of dispersion into the system to be thickened. Problems associated with the use of solid thickeners, however, include poor dispersibility when added to organic systems. Problems as to dust are similar to those encountered with other types of particulate materials, such as fumed silica. When added to systems, solid thickeners by their nature tend to agglomerate to form clumps. Agglomeration can be reduced in many cases by adding the thickener to the system with agitation. Such dissolution can be very slow, and can adversely affect the efficiency of specific manufacturing operations.

Particularly in formulations comprising other chemicals and ingredients, extended agitation and aging periods are required before proper incorporation is attained. Even when such additives are furnished as diluted solutions, they are still difficult to dilute uniformly, so as to avoid the production of local areas of high concentration. This difficulty requires users and formulators to develop crude empirical methods for estimating the final rheological properties of the formulations.

For the above reasons, manufacturers have long searched for a fast, effective and simple way of incorporating polyamide-type thickeners into organic and other systems. To satisfy this desire, many commercial polyamide-type thickeners and rheological additives are today sold for paint and other compositions as liquids. Such commercial thickening compositions are prepared by dissolving a solid rheological additive in an organic solvent, which solvent is Newtonian. The reason for the utilization of such an organic solvent is to lower the viscosity of the rheological additive, which is non-pourable and solid, to provide ease in handling as a liquid. The choice of type and percentage of solvent depends on the desired viscosity of the thickening composition mixture. Typically, the viscosity of the pourable thickening composition mixture should be less than about 250–300,000 cP (at 10 RPM with a Brookfield RVT viscometer) so that it will readily pour from the storage container as a liquid, and rapidly incorporate into the system to be thickened at room temperature. The solvent selected for each such commercial composition has, up to this time, almost exclusively been a volatile organic solvent. It was believed that the solvent used should be volatile. Ranges of ratios of 20% to 50% rheological additive to 50%–80% solvent are common for such commercial liquid products.

Water-soluble polymer associative thickeners for aqueous systems have also been prepared and have been used as thickeners in a dry, solid form. The same problems associated with the use of solid polymers in organic systems have occurred in aqueous systems, including poor dispersibility and undesirably long dissolution times. In addition, the dust associated with the incorporation of dry polymers into aqueous systems presents similar conventional handling problems as are encountered with other types of particulate materials.

For the above reasons, water system manufacturers have also searched for a fast way of incorporating associative polymers into aqueous systems. For this reason, most commercial associative thickeners are today sold as pourable liquids. Such commercial rheological additives in liquid form for water reducible and latex paints, and other compositions, involve preparing the thickening composition by mixing the solid associative thickener into a mixture of water and a water miscible organic solvent, such as diethylene glycol monobutyl ether (also known as butyl Carbitol™) or ethylene or propylene glycol. The main reason for the addition of this organic solvent is to provide ease in handling. The solvent selected for each such commercial compositions has, up to this time, been almost always a volatile solvent.

The use of a volatile organic solvent with the rheological additive contributes to the overall volatile organic content ("VOC") of the system that is thickened. Although rheological additives are used at relatively low levels in organic and aqueous systems, they may still contribute to the total VOC of the system, because they are typically provided as solutions or dispersions in the aforesaid organic solvent mixtures. As discussed, many commercial rheological additives for organic and aqueous-based paint and similar systems, are currently sold as liquids in a thickener/solvent mixture. This solvent evaporates after products containing such chemicals are applied, and enters the atmosphere during the drying and/or curing of the system. Similar evaporation occurs during the manufacture of inks, polyester, fiberglass systems, and greases.

The elimination of the release of organic vapors in the use of various types of industrial paint applications and in the manufacture of ink, polyesters, and coated articles such as automobiles, body putties and furniture, has become increasingly important in combating atmospheric pollution and in improving human health and safety. Such organic vapors not only have an offensive odor, but they may also cause damage to vegetation, wildlife and other aspects of the external environment, besides constituting a health hazard. The authorities in many countries, including the United States and Western Europe, have increasingly stringent limitations upon the emission of such gases to the atmosphere, and it could become imperative to operators and users in many countries to remove virtually all such volatile organics, under the penalty of an absolute ban on continuing operation of the impacted business activity. A recent California statute prohibits the manufacture or sale of any coating which contains more than a set amount of volatile organic compounds per liter, and other states are expected to follow with similar prohibitions.

A liquid thickening composition having little or no VOC will contribute little or zero VOC to the system being thickened, while having the advantage of being pourable.

The manufacture of a pourable thickener, which would be substantially 100% active, containing no or very little solvent, has been perceived heretofore as presenting daunting technical difficulties that led many scientists to conclude that it would be impossible to achieve. Rheological additives must provide high levels of viscosity or thickness to systems, which prior to such addition are often less viscous. Some systems, such as greases, must in fact become gel-like as a result of the addition. The rheological additives must be efficient—when added at very small relative weight levels—and must, therefore, have the ability, at such levels, to impart significant increases in viscosity to much larger volumes of organic and other systems. Rheological additives in fact often must impart to systems at very low shear rates a behavior that approaches that of a solid. These requirements led scientists to conclude that such additives must themselves have very high viscosity levels, and that they must be either solid or solid-like. A rheological additive, which could in some circumstances be liquid and pourable, and could at a 100% concentration be less viscous than the system to be thickened (where it would be present at a level of around 2% or less) appeared to many scientists to be a chemical and physical impossibility.

Consequently, despite the numerous types of rheological additives known in the art, research has been independently and simultaneously conducted toward both 100% active liquid thickeners that are in pourable, pumpable forms, and which are highly efficient and are readily dispersible in the composition to be thickened; and, in addition, toward non-VOC-containing rheological additives which overcome the deficiencies associated with prior art volatile solvent-mixed thickeners.

OBJECT AND SUMMARY OF THE INVENTION

Objects of the Invention:

It is a specific object of the present invention to provide a 100% active rheological additive in pourable liquid form, which is efficient in thickening and providing rheological properties to organic, aqueous and other compositions.

It is a further object of the present invention to provide a rheological thixotrope which is either entirely free of volatile solvents, or contains a greatly reduced amount of such solvents, in an easily pourable, pumpable form, and which is fluid at ambient temperatures for systems including inks, paints, epoxies, polyesters and coatings.

It is a further object of the present invention to provide a liquid rheological additive that can be readily dispersed in the composition to be thickened.

It is a still further object of the present invention to provide a pourable rheological additive for organic, solvent-based and other compositions which is easy to handle and which can readily be incorporated into the compositions almost at any stage during their processing.

It is a still further object of the invention to provide a rheological additive which shows no adverse effect on gloss in various commercial compositions.

SUMMARY OF THE INVENTION

This invention is of a liquid thixotrope, which is free of solvents or any other diluent, and is in easily usable, liquid form, pourable at ambient temperatures, and providing effective and efficient rheological properties when used at low levels in organic, aqueous and other systems. Unlike prior additives, this rheological liquid additive is completely rheologically active and efficient and does not require any solvent to maintain a liquid state.

In one specific aspect, the present invention provides a rheological additive which comprises the reaction product of (a) an alkoxylated nitrogen containing diol compound, (b) one or more polycarboxylic acids and (c) a chain termination unit which retains interactive groups after reaction with a prepolymer formed of a) and b). This additive is liquid and pourable at nearly 100% active material without the need of a volatile solvent, and provides acceptable rheology and viscosity to a large variety of organic and other systems at low levels of use.

In another aspect, the reaction product of elements a) and b) above is reacted with element d), which is a diamine, to produce a rheological additive with similar chemical and rheological properties.

Further advantages and features of the invention, as well as the scope, nature and utilization of the invention, will become apparent to those of ordinary skill in the art from the description of the preferred embodiment of the invention set forth below.

DESCRIPTION OF THE PREFERRED EMBODIMENTS

The liquid additives of this invention may be made using a variety of materials and by a variety of methods either disclosed hereafter, or which will appear obvious when the disclosure of this patent occurs. Applicants do not intend to limit the materials or methods of manufacture of such additives by the following descriptions.

One aspect of the present invention relates to a rheological additive composition comprising a condensation product from the reaction of:

a) One or more liquid alkoxylated nitrogen containing compounds;

b) One or more polycarboxylic acids; and c) A chain termination unit which retains interactive groups after reaction with elements a) and b).

Compounds useful for element a) include alkoxylated aliphatic amine diols and alkoxylated aliphatic amide diols which are liquids at ambient temperatures. These compounds can normally be selected from tertiary amines with one alkyl group and preferably two hydroxyalkyl or polyoxyalkylene groups attached to the nitrogen atom and have a general chemical structure represented by the following formula (I):

where:

(1) $R_1$, which also provides another one of the important functions of the invention, is a pendent straight or branched chain aliphatic alkyl or alkenyl radical having 6 to 40 carbon atoms, preferably 8 to 20 carbon atoms, and most preferably 10 to 18 carbon atoms. Especially preferred is where $R_1$ is a fatty alkyl having 12 to 18 carbon atoms such as coco, stearyl, soya, tallow, hydrogenated tallow, oleyl and mixtures thereof.

$$R_2 \text{ is } -\underset{\underset{O}{\|}}{C}- \text{ or } -CH_2 \text{ and} \qquad (2)$$

3) $R_3$ is hydrogen or methyl.

The oxyalkylene group which also provides one of the important functions of the invention is represented by $$(CH_2\underset{\underset{R_3}{|}}{CH}-O)_x$$

where $R_3$ is a hydrogen or methyl group and x is 1 or 2 and is preferably ethoxyl, propoxy or a mixture thereof. At least one of x or y is at least 1 preferably both x and y are at least 1 and the sum of x+y is from 1 to 40, preferably 2 to 30, and most preferably 2 to 20. Illustrative examples of such alkoxylated aliphatic amine diols useful in this invention and represented by formula (I) are available under the trade name Varonic, from Witco Corporation, and Ethomeen from Akzo Chemie America, and include polyoxyethylene(5)cocoamine, polyoxyethylene(10)cocoamine, polyoxyethylene(15)cocoamine, polyoxyethylene(5)octadecylamine, polyoxyethylene(10)octadecylamine, polyoxyethylene(15)octadecylamine, polyoxyethylene(5)tallowamine, polyoxyethylene(15)tallowamine, polyoxyethylene(5)oleylamine, polyoxyethylene(15)oleylamine, polyoxyethylene(5)soyaamine, polyoxyethylene(10)soyaamine, polyoxyethylene(15)soyaamine, wherein the number in parentheses is the sum of x+y. Useful alkoxylated aliphatic amides are also available from Akzo Chemie America under the trade name Ethomid. The amount of alkoxylated nitrogen containing compound used in this invention is most preferably in the range of from about 15 to 75 parts by weight of the reactants.

The use of one or more liquid alkoxylated nitrogen-containing compounds in this invention assists in creating a rheological additive which is an easily pourable or pumpable liquid at ambient temperatures, but which when dispersed will provide substantial viscosity to the system to be thickened. The presence of an unsaturated moiety or moieties of the fatty chain in the liquid alkoxylated compound provides the additional benefit of lowering the melting point of the resulting rheological additive, thereby assisting in assuring a liquid rheological additive at room temperature.

Compounds useful for element b), the polycarboxylic acid or acids employed in this invention can be selected from any aromatic, aliphatic or cycloaliphatic, straight chain or branched chain, saturated or unsaturated dicarboxylic acid which have at least 2 carbon atoms, and more preferably 3 to 40 carbon atoms. Examples of these are oxalic acid, malonic acid, succinic acid, glutaric acid, adipic acid, pimelic acid, suberic acid, sebacic acid, azelaic acid, undecanedioic acid, 1,11-undecanedicarboxylic acid, dodecanedioic acid, hexadecanedioic acid, docosanedioic acid, maleic acid, fumaric acid and the like either alone or mixtures thereof. The term "dicarboxylic acids" is also used to include hydroxy substituted dicarboxylic acids. Representative of hydroxy substituted dicarboxylic acids are tartaric acid, citric acid and hydroxyisophthalic acid. Dicarboxylic acids of oligomers of fatty acids having carbon chain length of from 16 to 20 carbon atoms are preferred. Exemplary fatty acids are those derived from soybean oil, tall oil, corn oil, linseed oil, cottonseed oil, castor oil, kapok seed oil, rice bran oil and mixtures thereof. Even further preferred are oligomers of fatty acids which are substantially comprised of the dimerized fatty acid. These are normally called "dimer acids". These dimerized fatty acids constitute at least 75% by weight of dibasic acid. The oligomerized fatty acid preferably also may have a low monomer content such as less than about 8% by weight. The dimerized fatty acids also preferably should have a low polybasic acid content, such as less than about 20% by weight. These dimer acids are commercially available under the trade names, Empol Dimer Acids from Henkel Corporation-Emery Group, and Pripol Dimer Acids from Unichema, International. Illustrative examples of branched dimer acids are Empol 1004, Empol 1008, Empol 1018, Empol 1016, and the like. The amount of polycarboxylic acid or acids used in this invention is more preferably in the range of 8 to 90 parts by weight, or most preferably in the range of from about 10 to 85 parts by weight of the reactants.

In addition to the dicarboxylic acids, polybasic acids which contain more than two carboxylic acid groups are also useable. Representative examples of these polybasic acids are trimellitic acid, trimesic acid, citric acid, 1,2,3,4-butane tetracarboxylic acid and the like. Polymerized polybasic acids which contain more than two carboxylic acid groups are also included in the definition of polybasic acids. Especially preferred polymerized polybasic acids are fatty acids having carbon chains from 48 to 60. The polymeric polybasic acids with 3 carboxylic acid groups are known as "trimer acids". These trimer acids are commercially available under the trade name Empol from Henkel Corporation-Emery Group, and Unidyme from Union Camp Corporation. Representative examples of these trimer acids are Empol 1040, Empol 1041, Empol 1052, and Unidyme 60. A preferred polybasic acid is 1,2,3,4-butane tetracarboxylic acid. More preferred trimer acids are Empol 1040 and Empol 1041, and a most preferred trimer acid is Empol 1040. Empol 1040 is substantially comprised of by weight of polybasic acid (67%), dibasic acid and (31%), and monobasic acid (2%). The amount of acid selected for use can be important. If the amount selected is excessive then a highly elastic and insoluble material may result.

As to element c), the chain ending unit or agent is utilized to terminate the reaction product of the alkoxylated nitrogen containing compound and the polycarboxylic acid. The agent may be any such agent having one or more active moieties which may undergo a reaction with an acid terminated prepolymer. The chain ending unit contains most preferably a branched chain either aliphatic, cycloaliphatic or aromatic, and should, as an important aspect of the invention, have one or more interactive groups, which are selected so as to be non-reactive with the other components used after they react to form a prepolymer. Preferably, the capping agent is an amino alcohol which has amine and hydroxyl moieties. The amine moieties of such preferred capping agents may be primary or secondary. The amino alcohol generally may have from 2 to 8 carbon atoms. It is preferred to have an amino alcohol chain ending unit containing one primary or secondary amino group which reacts with the prepolymer and one or more hydroxy group, such that the reaction product is the thermodynamically favored amide moieties and if branched, better results normally can be obtained. Illustrative examples of branched agents are 2-amino-2-methyl-1-propanol, o-,m-, and p-aminophenols, 2-amino-2-methyl-1,3-propanediol, 2-amino-2-ethyl-1,3-propanediol, tris(hydroxymethyl)amino methane and the like. Non-branched agents such as diethanolamine also are useful. The most preferred capping agent is tris(hydroxymethyl)amino methane. It is to be understood that mixtures of chain ending agents of the described type may be used. The amount of chain ending agent used is from 2 to 40 parts by weight of the reactants.

The compositions of the present invention are rheological liquids without diluent which effectively impart thixotropic properties to systems in which they are utilized. These properties are equal to previously known solid thixotropes. When used, the additives contain no solvent, or may optionally contain substantially reduced solvent. Organic or other solvent can be used at less than about 25% by weight, if convenient for either manufacture or use. The rheological additives of the present invention are a substantial improvement over known additives. In contrast to some particulate-type rheological additives, which are exemplified by organomodified clays, associative aqueous thickeners and finely divided (fumed) amorphous silica, the rheological additives of the present invention have excellent flow and leveling properties, as well as excellent efficiency and easy dispersing characteristics. Compared to recent solid rheological additives disclosed in the art, the rheological additives of this invention can be incorporated in the system as rheological liquids.

While not bound by any theory, the liquid rheological additives of the present invention are believed to function in part as thickeners by interaction with the resin and the pigment in the system to be thickened. The formation of hydrogen bonding due to the presence of amide and hydroxyl groups in the structure of the additive influences the makeup of a random network of high surface area, thereby increasing interaction with the resin and the pigment in the composition to be thickened. Such a thickening mechanism may explain why a pourable liquid can at low levels of use provide substantial viscosity to a much larger volume system.

Also the proposed mechanism of associative thickening of systems and solutions, particularly in aqueous systems, is in part through physical interactions between the pendant moieties associated with compound a) in the thickener molecule. Their associations with one another create a three dimensional network of thickener molecules that results in a very high viscosity when dispersed into an system. The ethoxylated moieties of compound a) provide an inverse micellar structure when in a system composition. When added to a system, for example an organic system, the combination of mechanisms in combination with the interactivity of the chain end group allow the thickener to have less association with itself; the thickener molecule then both (i) interacts with and (ii) associates with moieties of the organic composition, and entangles with itself, and is thereby believed to thicken in a novel and unusual manner. The rheological additive prior to dispersion is fully liquid of a viscosity that permits pourability.

Diamines can be optionally employed in preparing the compositions of the present invention. In such case element d), the diamine, is reacted with one or more alkoxylated nitrogen containing compounds and one or more polycarboxylic acids. These diamines may be one or more of the known branched aliphatic, aromatic, cycloaliphatic diamines having from about 2 to 44 carbon atoms. The diamines are selected from the particular type of amines which are liquids at ambient temperatures. Illustrative of a preferred diamine is isophorone diamine.

Also preferred are the polyglycol polyamines. These polyamines contain primary amino groups attached to the terminus of the polyether backbone. They are thus known as polyether diamines (also called polyglycol polyamines). The polyetherdiamines make up a family of products having repeating polyether backbone structures containing repeating propylene oxide, ethylene oxide, or mixed ethylene oxide/propylene oxide units such as polyoxyalkylene diamines of the formula $$H_2N-R_1-(OR_2)_x-NH_2 \quad (II)$$

and $$H_2N-R_1-(OR_2)_a-(OR_3)_b-(OR_2)_c-NH_2 \quad (III)$$

where $R_1$ is the alkylene group, $R_2$ and $R_3$ are ethylene or propylene groups, x, a, b, and c indicate number of repeating units of ethylene oxide and propylene oxide groups. These repeating units are present on average more than once.

Polyetherdiamines can also be derived from random copolymers of the formula:

$$H_2N-R_1-[(OR_2)_{a_c}-(OR_3)_{b_c}]_c-OR_4-NH_2 \quad (IV)$$

where $R_1$ and $R_4$ are the alkylene groups, $R_2$ and $R_3$ are ethylene or propylene groups, a, b and c are integers.

Polyetherdiamines known in the trade as polyglycol polyamines of various molecular weights are sold under the trade name "Jeffamines" by Texaco, Inc., and are also useful. Representative examples of such diamines are Jeffamine D-230, Jeffamine D-400, Jeffamine D-2000, Jeffamine ED-600 and Jeffamine ED-900.

The Jeffamine D-series products are amine-terminated polypropylene glycols. They have the structure:

$$H_2NCHCH_2-[OCH_2CH]_x-NH_2$$
$$\phantom{H_2NC}|\phantom{HCH_2-[OCH_2CH]_x-N}|$$
$$\phantom{H_2NC}CH_3\phantom{HCH_2-[OCH_2C}CH_3$$

The above described products have the following characteristics:

| Product | X | Approx. Mol. Wt. |
|---|---|---|
| D-230 | 2-3 | 230 |
| D-400 | 5-6 | 400 |
| D-2000 | 33 (Avg.) | 2,000 |

The Jeffamine ED-series are poly-ether diamines based on a predominately polyethylene oxide backbone. The Jeffamine ED-series products have the structure:

$$H_2NCHCH_2-[OCHCH_2]_a-[OCH_2CH_2]_b-[OCH_2CH]_c-NH_2$$
$$\phantom{H_2NC}|\phantom{HCH_2-[OCHC}|\phantom{H_2]_a-[OCH_2CH_2]_b-[OCH_2C}|$$
$$\phantom{H_2NC}CH_3\phantom{HCH_2-[OC}CH_3\phantom{H_2]_a-[OCH_2CH_2]_b-[OCH_2C}CH_3$$

The above representative examples have the following characteristics:

| Product | Approx. b | Value a + c | Approx. Mol. Wt. |
|---|---|---|---|
| ED-600 | 8.5 | 2.5 | 600 |
| ED-900 | 15.5 | 2.5 | 900 |

Other suitable diamines are the urea condensates of Jeffamine-D series products of the formula $$H_2N-R_1-(OR_1)_n-NH-\underset{\underset{O}{\|}}{C}-\underset{\underset{H}{|}}{N}-(OR_1)_n-R_1NH_2 \quad (V)$$

where $R_1$ is the alkylene group and n is, on the average 5.6, such as Jeffamine DU-700.

Preferred polyether diamines are represented by formula II and formula III with molecular weights ranging from 200–2000. According to the present invention a mixture of diamines are also preferred so that the average effective molecular weights range from 300–2000. Further preferred polyether polyamines are Jeffamine D-400 and Jeffamine ED-600. The most preferred polyamines according to this present invention are Jeffamine D-400 and isophorone diamine. The proportion of the diamines employed in making the inventive rheological additive is in the range of 0.5 to 20 parts by weight, or more preferably in the range of 0.5 to 15 parts by weight, or most preferably from 0.7 to 12 parts by weight. The reaction product of a), b) and d) results in a liquid polymer with termini that contain interactive units and which functions as a liquid rheological additive in a similar manner to that previously described.

The rheological additive of the present invention may be used to thicken a variety of organic and solvent-based compositions, and the rheological additive may also be used in solvent-free and aqueous compositions particularly water reducible systems. The additive is particularly useful, for example, in thickening aliphatic and aromatic solvent-based compositions, and may also be used in polar (ketones, alcohols, esters) based compositions. Illustrative organic compositions include aliphatic alkyd paints such as "trade sales" paints, varnishes, epoxy-based paints, polyesters, modified alkyd based paints and alkyd, polyester and acrylic bake enamels, such as standard quality industrial paints, certain sealants and unsaturated polyester resin formulations. The additives are useful in aromatic high solids bake enamels which include systems based on alkyd/melamine, acrylic/melamine, and polyester/melamine system including appliance enamels, and equipment enamels. Additionally, the additives find use in high solids air-dry enamels based on alkyd and modified alkyd formulations.

In addition to the aliphatic and aromatic solvent-based systems, the additive of the present invention may also be used in petroleum-based and vegetable oil-based systems. Representative examples of petroleum solvents include Magiesol 52 sold by Magie Bros., Sunprint HP 750 marketed by Sun Inc., and Exprint 705 sold by Exxon Chemical Company. Illustrative vegetable oils include but are not limited to soybean oil, rapeseed oil, canola oil, palm oil, rice bran oil and the like. The additive is also effective in thickening various printing ink compositions. The printing inks in which the thixotropic additive is used include but are not limited to letterpress, web offset, lithographic and flexographic printing inks. The additives of this invention can easily be dispersed into the organic composition to provide improved viscosity build. The additive can be dispersed in the composition at any temperature used in the production.

The liquid additive of the present invention can also be used in aqueous systems most particularly water reducible paints and coatings. The liquid antisettling compositions of the present invention may be used as a rheology modifier in a variety of water-based compositions. The compositions of the invention are useful, for example, in imparting thixotropic properties to latex (including vinyl acrylic and acrylic latex coatings) and water-reducible products, including water-reducible alkyd paint formulations, water-based ink formulations, water-based traffic paints, water-based dip coat formulations, and water-based foundry compounds.

Since the additive is an easily pourable or a pumpable rheological liquid it can be incorporated very easily into a variety of compositions at various stages of their preparation. The composition of this invention can also be added at any stage of the composition production. It can be added at the beginning of processing, during processing, or as a post-add.

The amount of rheological additive used in a specific instance is determined by numerous factors, including the type of the organic solvent-based composition to be thickened, and the level of thickening desired. However, a general range is from about 1.5 to about 30 pounds per hundred gallons of composition. On a weight basis, the amount of the rheological additive is generally from about 0.1 to about 10% by weight, preferably from about 0.1 to about 8% by weight, more preferably from about 0.1 to about 5% by weight and most preferably from about 0.2% to about 3% by weight of the system to be thickened.

The rheological additive of the present invention may be prepared according to the known polycondensation reaction. The order of the addition of the co-reactants is not generally important and these can be added either at ambient temperature or at reaction temperature. For example, the reactants may be charged in increments to a suitable reaction vessel equipped with a mechanical stirrer, a thermometer, a Dean-Stark adaptor or other water collector and a nitrogen inlet. The vessel containing the reactants is heated under a blanket of nitrogen. The reaction may be carried out under atmospheric pressure or under vacuum. The reaction temperature to be used in the synthesis may be varied, but preferably ranges from ambient temperature to 300° C. More preferably, the temperature ranges from ambient to 250° C., and most preferably from 120° C. to 220° C. Water is removed as condensate as the reaction progresses. After the completion of the reaction, the additive is cooled and discharged.

The additive of the present invention may be synthesized with or without a catalyst. The catalyst, if used, may be selected from those which are normally used for condensation reactions. Examples of such catalysts include, but are not limited to, sulfuric acid, p-toluene sulfonic acid, dibutytin dilaurate, tetraalkyl tin or titanium compounds, metal hydrides and the like. A preferred catalyst is p-toluene sulfonic acid. The catalyst should generally be used in an amount of from about 0.001 to 2.5 percent by weight based on the total weight of the reactants.

The additive of the present invention may be manufactured with or without an organic solvent. Since the form of the rheological control agent is a solvent-free diluent-free pourable liquid, it is preferable to synthesize the product in a solvent-free environment. Since the solvent-free product is a viscous liquid, it may be appropriate to use a solvent at the let down stage during the synthesis to make the product even more pourable. When a solvent is used during synthesis, the type of solvent is not critical. If it is appropriate to use a solvent during the synthesis, the same solvent used into the coating composition in which the rheological additive could be incorporated may be preferred. However, the preferred solvents, if used at all, for synthesizing the rheological additive of this invention are aromatic solvents, such as toluene, xylene, aromatic petroleum distillates and mixtures thereof, aliphatic solvents such as hexane, heptane, cyclohexane and aliphatic petroleum distillates and mixtures thereof. The most preferred solvents are aromatic petroleum distillates such as being sold under the trade name Aromatic 100 by Exxon Chemical Company. A combination of solvents could be employed as long as the solvents are compatible. The solvent should generally be used from 0 to 25 percent by weight of the reaction mixture.

The liquid rheological additives of the present invention can provide important advantages in a variety of organic and aqueous compositions. Since the rheological additives of the present invention are solvent-free (zero VOC) or contain substantially reduced solvent (low VOC) they are thus compatible with all coating, ink or polyester systems regardless of VOC specification. Since the rheological additives of the present invention are easily pourable liquids, they are highly dispersible at low activation temperatures in almost all systems. Furthermore, because the rheological additives impart effective rheological properties to compositions, their use enables coating formulations to be prepared which do not unduly sag or flow when applied to vertical surfaces. As added benefits, the rheological additives of the present invention generally do not significantly affect the gloss or fineness of grind of the original paint or coating composition.

DESCRIPTION OF TESTS

The present invention is exemplified and compared in the following examples. However, the Examples should not be construed as limiting the invention.

In the following examples, parts are given by weight unless otherwise indicated.

Ethomeen C-15 is polyoxyethylene(5)cocoamine (CTFA adopted name-PEG-5 cocoamine). Ethomeen 18/20 is polyoxyethylene(10)octadecylamine (CTFA adopted name-PEG- 20 stearamine). Empol 1004 is a hydrogenated dimer acid produced by the dimerization of $C_{18}$ fatty acids. Varonic K-205 is a polyoxyethylene(5)cocoamine, Empol 1040 is a hydrogenated trimer acid produced by the polymerization of $C_{18}$ fatty acids. Empol 1018 is a hydrogenated dimer acid produced by the dimerization of $C_{18}$ fatty acid with a higher tribasic content than Empol 1004. Pripol 1025 is a hydrogenated dimer acid produced by the dimerization of $C_{18}$ fatty acids.

EXAMPLE 1

To a 3 liter resin kettle equipped with a thermometer, a Dean-Stark adaptor, a mechanical stirrer and a nitrogen inlet, 590.8 parts Ethomeen C-15 and 1190.7 parts Empol 1004 were charged. The mixture is heated to 200° C. with stirring under a blanket of nitrogen. Water starts to come off at 170° C. After an hour at 200° C., aliquots are taken hourly and the acid and the amine values are determined. When the acid and the amine values are around 42 and 46 respectively (which takes about 4 hrs. from the start of the reaction), 167.45 parts 2-amino-2-ethyl-1,3-propanediol were charged and the react ion continued until the acid value is below 5 and the amine value is below 46. At the end of the reaction, the product is cooled and discharged. The product was cooled to ambient temperature and was liquid.

Infrared analysis of the product indicated the presence of ester band at 1739.7 $cm^{-1}$ and amide band at 1667.4 $cm^{-1}$. Molecular weight analysis with GPC methods against a polyethylene glycol standard indicated an average molecular weight of 4,544.

EXAMPLE 2

To illustrate the obtaining of reactive ends to the polymer without the use of a chain ending unit, the following experiment was conducted. To a 1 liter 4-necked round bottomed flask equipped with a thermometer, a mechanical stirrer, a Dean-Stark adaptor, and a nitrogen inlet is charged 326.25 parts Varonic K-205, 406.5 parts Empol 1018, 97.65 parts Empol 1040 and 38.25 parts isophorone diamine. The mixture is heated to 200° C. with stirring under a blanket of nitrogen. Water starts to come off at 170° C. and the reaction mixture begins to thicken. After an hour at 200° C., aliquots are taken hourly and the acid and the amine values are determined. The reaction is continued until the acid value is below 10 and the amine value is below 50. At the end of the reaction, the product is cooled and discharged; again the product was liquid.

EXAMPLE 3

To a 250 ml 3-necked round bottomed flask equipped with a thermometer, a mechanical stirrer, a Dean-Stark adaptor, and a nitrogen inlet 35.5 parts Ethomeen 18/20, 42.9 parts Empol 1004 and 0.76 parts p-toluene sulfonic acid catalyst were charged. The mixture is heated to 200° C. with stirring under a blanket of nitrogen. Water starts to come off at 170° C., and the reaction mixture begins to thicken. After an hour at 200° C., aliquots are taken hourly, and the acid and the amine values are determined. After 2 hrs., when the acid value reaches about 50, 6.06 parts of a chain-ending agent tris(hydroxymethyl)aminomethane was charged and the reaction continued until the acid and amine values reached 4 and 32, respectively. At the end of the reaction, the product is cooled and discharged; the product was liquid.

EXAMPLES 4–8

The general procedure outlined in Example 1 is used, except that the reactants were replaced as indicated in Table 1. All examples were liquid and used branched chain ending units except Example 7 which used a non-branched chain ending unit.

TABLE 1

| Example | Reagents | Parts | Acid Value* | Amine Value* |
|---|---|---|---|---|
| 4 | Ethomeen C-15 | 32.32 | 4 | 43 |
|   | Pripol 1025 | 66.0 |   |   |
|   | p-Toluene sulfonic Acid | 1.0 |   |   |
|   | Tris(hydroxymethyl) aminomethane | 9.69 |   |   |
| 5 | Ethomeen C-15 | 20.8 | 3 | 45 |
|   | Empol 1008 | 41.25 |   |   |
|   | p-Toluene sulfonic Acid | 0.62 |   |   |
|   | Tris(hydroxymethyl) aminomethane | 6.06 |   |   |
| 6 | Ethomeen C-15 | 20.8 | 3 | 42 |
|   | Empol 1004 | 42.9 |   |   |
|   | p-Toluene sulfonic Acid | 0.63 |   |   |
|   | Tris(hydroxymethyl) aminomethane | 6.06 |   |   |
| 7 | Ethomeen C-15 | 32.32 | 12 | 33 |
|   | Empol 1004 | 68.64 |   |   |
|   | p-Toluene sulfonic Acid | 1.0 |   |   |
|   | 2-(2-Aminoethoxy) ethanol | 8.41 |   |   |
| 8 | Ethomeen C-15 | 32.32 | 5 | 34 |
|   | Empol 1018 | 68.40 |   |   |
|   | p-Toluene sulfonic Acid | 1.0 |   |   |
|   | 2-Amino-2-ethyl-1,3-propanediol | 9.89 |   |   |

*The acid and the amine values indicated are for the final product.

EXAMPLES 9–13

The general procedure outlined in Example 2 is used except that the reactants were replaced as indicated in Table 2. All examples were liquid.

TABLE 2

| Example | Reagents | Parts | Acid Value* | Amine Value* |
|---|---|---|---|---|
| 9 | Ethomeen C-15 | 1101.42 | 14 | 78 |
|  | Adipic Acid | 312.16 |  |  |
|  | Empol 1040 | 409.58 |  |  |
|  | Jeffamine D-400 | 189.84 |  |  |
| 10 | Ethomeen C-15 | 66.66 | 5 | 84 |
|  | Adipic Acid | 10.96 |  |  |
|  | Empol 1040 | 26.04 |  |  |
|  | Jeffamine D-400 | 12.0 |  |  |
| 11 | Ethomeen C-15 | 40.4 | 9 | 50 |
|  | Empol 1018 | 68.4 |  |  |
|  | Empol 1040 | 10.42 |  |  |
|  | Isophorone diamine | 5.1 |  |  |
| 12 | Ethomeen C-15 | 303.0 | 7 | 42 |
|  | Empol 1018 | 427.5 |  |  |
|  | Empol 1040 | 97.65 |  |  |
|  | Isophorone diamine | 38.25 |  |  |
| 13 | Ethomeen C-15 | 40.40 | 7 | 42 |
|  | Empol 1018 | 57.0 |  |  |
|  | Empol 1040 | 17.36 |  |  |
|  | Isophorone diamine | 6.85 |  |  |
|  | Jeffamine D-400 | 12.0 |  |  |

*The acid and the amine values indicated are for the final product.

Comparative Example A

As a comparative example, a 250 ml 3-necked round bottomed flask equipped with a thermometer, a mechanical stirrer, a Dean-Stark adaptor, and a nitrogen inlet, 40.4 parts Ethomeen C-15, 57.2 parts Empol 1004, 17.36 parts Empol 1040, 4.65 parts 1,6-hexanediamine and 1.2 parts of p-toluene sulfonic acid were charged. The mixture is heated to 200° C. with stirring under a blanket of nitrogen. Water starts to come off at 170° C. and the reaction mixture begins to thicken. After an hour at 200° C., aliquots are taken hourly and the acid and the amine values are determined. After 4.5 hrs at 200° C., 1.19 parts 2-amino-2-ethyl-1,3-propanediol was charged to the reaction mixture. The reaction is continued until the acid value is 13 and the amine value is 40. At the end of the reaction, the product is cooled to 120° C. and discharged. The product was a solid.

Comparative Example B

Also as a comparative example, to a 250 ml 3-necked round bottomed flask equipped with a thermometer, a mechanical stirrer, a Dean-Stark adaptor, and a nitrogen inlet 40.4 parts Ethomeen C-15, 57.0 parts Empol 1018, 17.36 parts Empol 1040, 4.65 parts 1,6-hexanediamine and 1.2 parts of p-toluene sulfonic acid were charged. The mixture is heated to 200° C. with stirring under a blanket of nitrogen. Water starts to come off at 170° C. and the reaction mixture begins to thicken. After an hour at 200° C., aliquots are taken hourly and the acid and the amine values are determined. The reaction is continued until the acid value is 14 and the amine value is 38. At the end of the reaction, the product is cooled to 120° C. and discharged. The product was solid.

Comparative Examples. C, D

Further comparative examples were produced. The general procedure outlined in Example 2 is used except that the reactants were replaced as indicated in Table 3. Both products were solids.

TABLE 3

| Example | Reagents | Parts | Acid Value* | Amine Value* |
|---|---|---|---|---|
| Comparative Example C | Ethomeen C-15 | 60.6 | 15 | 70 |
|  | Adipic Acid | 19.73 |  |  |
|  | Empol 1040 | 26.43 |  |  |
|  | Dytek A (from DuPont) | 10.44 |  |  |
|  | p-Toluene sulfonic Acid | 1.18 |  |  |
| Comparative Example D | Ethomeen C-15 | 40.4 | 14 | 38 |
|  | Empol 1004 | 57.2 |  |  |
|  | Empol 1040 | 17.36 |  |  |
|  | 1,6-Hexanediamine | 4.65 |  |  |
|  | p-Toluene sulfonic Acid | 1.2 |  |  |

*The acid and the amine values indicated are for the final product.

EXAMPLE 14

As a further example similar to Example 2, to a 5 liter resin kettle equipped with a thermometer, a mechanical stirrer, a Dean-Stark adaptor, and a nitrogen inlet was charged 2400 parts Jeffamine D-400, 526.1 parts adipic acid and 263.7 parts Empol 1040. The mixture is heated to 200° C. with stirring under a blanket of nitrogen. Water begins to come off at 180°–190° C. and the reaction mixture begins to thicken. After one hour at 200° C., aliquots are taken hourly and acid and amine values are determined and the reaction is continued until the acid value is 2 and the amine value is about 46. The reaction product is cooled to 120°–130° C. and discharged; the product was a liquid.

EVALUATIONS OF RHEOLOGICAL ADDITIVES

I. Solvent-based Paint Systems

All the materials prepared according to Examples 1–14 were liquids and they, as well as Comparative Examples A to D, were incorporated by dispersing into a low VOC epoxy-polyamide two component system at a loading of 5 pounds per hundred gallons (pphg) and a number of tests were conducted to demonstrate the effectiveness of the respective rheological additive.

The preparation and components of a low VOC epoxy-polyamide two component paint is described in Formulation A. The ingredients were mixed using a Dispermat model CV, high speed dissolver fitted with a heavy duty 50 mm diameter impeller.

After the paints were made, they were allowed to equilibrate at room temperature overnight, and the paint properties were measured as described below:

(1) Fineness of grind (indicative of dispersibility) was measured in Hegman units using a wide-path Hegman gauge in accordance with ASTM D1210-79.

(2) Brookfield viscosities at 10 and 100 RPM were measured with a Brookfield Model RVT viscometer in accordance with ASTM D2196-81. From viscosity data, a Thixotropic Index (TI) was calculated as follows:

$$\text{Thixotropic Index } (TI) = \frac{\text{Viscosity at 10 RPM}}{\text{Viscosity at 100 RPM}}$$

(3) Sag resistance was measured in mils using a Leneta Sag multinotch applicator at room temperature in accordance with ASTM D4400-84.

(4) In some instances Stormer viscosities were measured in Krebs Units (KU) with a Thomas Stormer Instrument, Model #09730-G15, in accordance with ASTM D562-81.

(5) Gloss measurements were measured at 60° and/or 20° in accordance with ASTM D523-80. Drawdowns were prepared of paints according to Formulation A, and the 60° and/or 20° gloss determined after curing the film for 24 hours at room temperature. The results of the tests are set forth in Table 4.

COMPARATIVE EXAMPLE 1

A low VOC epoxy-polyamide two component paint was prepared according to the procedures described in Formulation A without the addition of a rheological additive. The paint properties were evaluated and are set forth in Table 4.

COMPARATIVE EXAMPLE 2

A portion of the low VOC epoxy-polyamide two component paint (described by Formulation A) was prepared with DISLON 6500, a solid commercially available polyamide, as the rheological additive. The paint properties which were obtained are set forth in Table 4. The additive loading was equivalent to 5 pphg. DISLON 6500 is a polyamide rheological additive available from Kusumoto Chemicals, Ltd. and distributed by King Industries.

COMPARATIVE EXAMPLE 3

A portion of the low VOC epoxy-polyamide two component paint (described by Formulation A) was prepared with THIXATROL TSR as the rheological additive. The paint properties which were obtained are set forth in Table 4. The additive loading was equivalent to 5 pphg. THIXATROL TSR is a polyamide-ester rheological additive dispersed in an organic solvent mixture available from RHEOX, Inc.

FORMULATION A
0.6 (lbs/gal) VOC EPOXY-POLYAMIDE TWO COMPONENT COATING

| Material | Generic | Manufacturer | Parts By Weight |
|---|---|---|---|
| PART A | | | |
| Epon 828 | Epoxy resin | SHELL CHEMICAL CO. | 343.8 |
| Silicon Resin SR 882 | Silicon resin solution | G. E. SILICONES | 7.0 |
| Nuosperse 700 | Phosphate ester surfactant | HULS AMERICA, INC. | 1.0 |
| Rheological Additive | | | 14.3 |
| Mix for 5 minutes at 3000 RPM, then add | | | |
| TITANOX 2101 | Titanium Dioxide | KRONOS, INC. | 380.0 |
| Xylene | Solvent | ASHLAND CHEMICAL CO. | 26.0 |
| Disperse at 5,000 RPM for 15 minutes at 130° F., reduce speed to 1,500 RPM and add | | | |
| Epon 828 | Epoxy resin | SHELL CHEMICAL CO. | 115.2 |
| Mix at 1,500 RPM for 3 minutes and cool. | | | |

| Material | Generic Name | Manufacturer | Parts By Weight |
|---|---|---|---|
| PART B | | | |
| Ancamide 506 | Amido Amine | PACIFIC ANCHOR CHEMICAL | 129.0 |
| Ancamide 1693 | Cycloaliphatic Amine | PACIFIC ANCHOR CHEMICAL | 129.0 |
| Toluene | Solvent | ASHLAND CHEMICAL CO. | 32.0 |
| Shake 10 minutes in a Red Devil Agitator. | | | |
| Mix 226 parts of Part A and 74 parts of Part B and shake for 3 minutes on a red Devil Agitator. | | | |

TABLE 4
Results in 0.6 (lbs/gal) VOC Epoxy-Polyamide two component system
Reacted Paint
Loading: 5 pphg

| Example | Hegman Grind | Brookfield Viscosity, cP 10 RPM/100 RPM | T.I. | Leneta Sag (mil) | Gloss 20°/60° | Stormer (KU) |
|---|---|---|---|---|---|---|
| 1 | 6B | 5,500/2,380 | 2.3 | 14 | 93/102 | 104 |
| 2 | 6.5C | 6,400/2,120 | 3.0 | 14 | 96/101 | 103 |
| 6 | 5B | 5,800/2,320 | 2.5 | 14 | 92/101 | 104 |
| 7 | 6B | 5,200/2,120 | 2.5 | 14 | 94/102 | 105 |

TABLE 4-continued

Results in 0.6 (lbs/gal) VOC Epoxy-Polyamide two component system
Reacted Paint
Loading: 5 pphg

| Example | Hegman Grind | Brookfield Viscosity, cP 10 RPM/100 RPM | T.I. | Leneta Sag (mil) | Gloss 20°/60° | Stormer (KU) |
| --- | --- | --- | --- | --- | --- | --- |
| 9 | 4A | 6,000/2,240 | 2.7 | 14 | 94/ND | ND |
| 10 | 6.5C | 4,600/1,920 | 2.4 | 10 | 96/102 | 101 |
| 12 | 5C | 4,450/1,900 | 2.3 | 10 | 93/101 | 102 |
| 13 | 5.5B | 4,200/1,860 | 2.3 | 10 | 92/104 | 102 |
| COMPARATIVE EXAMPLE 1 | 6.5C | 1,800/1,380 | 1.3 | 4 | 95/102 | 95 |
| COMPARATIVE EXAMPLE 2 | 5.5B | 2,400/1,640 | 1.5 | 6 | 94/101 | 100 |
| COMPARATIVE EXAMPLE 3 | 5.5B | 3,400/1,660 | 2.0 | 12 | 93/102 | 101 |

ND — NOT DETERMINED

Additionally, samples of rheological additives of the present invention were evaluated for fineness of grind, Brookfield and Stormer viscosities, sag and gloss using the procedure discussed previously in a high solids polyester bake enamel paint at a loading of 7.4 pphg. The preparation and components of the high solids polyester bake enamel paint are described in Formulation B.

Rheological additives prepared in accordance with Examples 1 and 6 set forth above were incorporated into the high solids polyester bake enamel paint and the results are described in Table 5.

COMPARATIVE EXAMPLE 4

A high solids polyester bake enamel paint was prepared according to the procedures described in Formulation B without the addition of a rheological additive. The paint properties were evaluated and are set forth in Table 5.

COMPARATIVE EXAMPLE 5

A portion of the high solids polyester-melamine bake enamel paint (described by Formulation B) was prepared with DISLON 6500 as the rheological additive. The paint properties which were obtained are set forth in Table 5. The additive loading was equivalent to 7.4 pphg.

COMPARATIVE EXAMPLE 6

A portion of the high solids polyester-melamine bake enamel paint (described by Formulation B) was prepared with THIXATROL TSR as the rheological additive. The paint properties which were obtained are set forth in Table 5. The additive loading was equivalent to 7.4 pphg.

FORMULATION B
HIGH SOLIDS POLYESTER-MELAMINE BAKE ENAMEL PAINT

| Material | Generic Name | Manufacturer | Parts By Weight |
| --- | --- | --- | --- |
| Cargil 154-1297 | Oil free polyester resin | CARGILL INC. | 526.6 |
| Rheological Additive | | | 7.4 |
| TITANOX 2101 | Titanium Dioxide | KRONOS, INC. | 741.7 |
| Grind at 5,000 RPM for 15 minutes while maintaining the temperature at 125° F. | | | |
| Let down | | | |
| Melamine 23-2347 | Melamine resin | CARGILL INC. | 215.1 |
| Nacure 2501 | p-Toluene sulfonic acid solution | KING INDUSTRIES | 14.8 |
| Mix 5 minutes at slow speed (2000 RPM). | | | |

TABLE 5

Results in High Solids Polyester Bake Enamel Paint
Loading: 7.4 pphg

| Example | Hegman Grind | Brookfield Viscosity, cP 10 RPM/100 RPM | T.I. | Leneta Sag (mil) | Gloss 20°/60° |
|---|---|---|---|---|---|
| 1 | 6.5B | 34,000/20,240 | 1.7 | >60 | 80/92 |
| 6 | 5.5C | 30,000/10,000 | 3.0 | 50 | 27/ND |
| COMPARATIVE EXAMPLE 4 | 6C | 5,000/3,750 | 1.3 | 4 | 95/96 |
| COMPARATIVE EXAMPLE 5 | 6B | 5,800/4,420 | 1.3 | 8 | 1/9 |
| COMPARATIVE EXAMPLE 6 | 6.5C | 13,200/4,780 | 2.8 | 18 | 18/60 |

ND — NOT DETERMINED

Additionally, samples of rheological additives of the present invention were evaluated for Brookfield and Stormer viscosities, sag and gloss using the procedure discussed previously in an epoxy topcoat paint system at a loading of 5 pphg. The preparation and components of the topcoat paint are described in Formulation C.

COMPARATIVE EXAMPLE 9

A portion of the epoxy topcoat bake enamel paint (described by Formulation C) was prepared with THIX-ATROL TSR as the rheological additive. The paint properties which were obtained are set forth in Table 6. The additive loading was equivalent to 5 pphg.

FORMULATION C
EPOXY TOPCOAT BAKE ENAMEL PAINT

| Material | Generic Name | Manufacturer | Parts By Weight |
|---|---|---|---|
| COMPONENT A | | | |
| Epon 1001 X75 | Epoxy resin | SHELL CHEMICAL CO. | 331.5 |
| PM Acetate | Solvent | ASHLAND CHEMICAL CO. | 86.0 |
| Beetle 216-8 | Urea formaldehyde resin | AMERICAN CYANAMID | 15.2 |
| Nuosperse 700 | Phosphate ester surfactant | HÜLS AMERICA, INC. | 7.6 |
| KRONOS 2101 | Titanium Dioxide | KRONOS, INC. | 316.6 |
| Rheological Additive | | | 10.0 |
| Grind, high speed disperser for 15 minutes @ 5000 RPM, then add | | | |
| PM Acetate | Solvent | ASHLAND CHEMICAL CO. | 152.1 |
| COMPONENT B | | | |
| Epon Curing Agent C-111 | Polyamine Adduct | SHELL CHEMICAL CO. | 132.2 |
| PM Acetate | Solvent | ASHLAND CHEMICAL CO. | 35.5 |
| Mix 5.4 parts of Component A and 1 part of Component B. | | | |

Rheological additives prepared in accordance with Example 1 set forth above were incorporated into the epoxy topcoat bake enamel paint and the results are described in Table 6.

COMPARATIVE EXAMPLE 7

An epoxy topcoat bake enamel paint was prepared according to the procedures described in Formulation C without the addition of a rheological additive. The paint properties were evaluated and are set forth in Table 6.

COMPARATIVE EXAMPLE 8

A portion of the epoxy topcoat bake enamel paint (described by Formulation C) was prepared with DISLON 6500 as the rheological additive. The paint properties which were obtained are set forth in Table 6. The additive loading was equivalent to 5 pphg.

TABLE 6

Results in Epoxy Topcoat paint system
Loading: 5 pphg

| Example | Stormer (KU) | Brookfield Viscosity, cP @ 10 RPM | Leneta Sag (mil) | Gloss 20° |
|---|---|---|---|---|
| 1 | 70 | 2200 | 12 | 82 |
| COMPARATIVE EXAMPLE 7 | 66 | 1300 | 5 | 80 |
| COMPARATIVE EXAMPLE 8 | 70 | 2100 | 9 | 68 |
| COMPARATIVE EXAMPLE 9 | 70 | 1900 | 12 | 59 |

As may be seen from the data set forth above, the rheological additives of the present invention described in the Examples are effective liquid additives providing excellent properties of high viscosity, anti-sagging, high thixotropic index and maintaining good gloss of the coated film compared to those comparative examples listed in Tables 4, 5 and 6. The examples also provide greater advantages of being solvent-free (zero VOC) easily pourable liquid fluids, or contain as low an amount of solvent (low VOC) as possible, yet are easy to handle compared to the comparative examples.

II. Petroleum-based Ink Systems

Materials prepared according to Examples 1–14 were incorporated into a heatset base red ink formulation at a loading of 2% (w/w) and a number of tests were conducted to demonstrate the effectiveness of the rheological additive.

The components of a web heatset red ink system are described in Formulation D, and the procedure for the preparation of ink samples is described under Ink Preparation.

| FORMULATION D: WEB OFFSET HEATSET RED FORMULA | | | |
|---|---|---|---|
| Component | Generic Name | Supplier | Weight % |
| OPTIMIX 1 LITHOL RUBINE 45 PP 0229 | Flush | BASF | 27.5 |
| MIRREX FG-9 XL | Heatset Gel Varnish | LAWTER | 51.5 |
| MAXICOMP 1B 326 | Wax Compound | AMPAC | 4.0 |
| MAGIESOL 52 | Ink Oil | MAGIE BROS. | 15.0 |
| Rheological Additive | (0.5–2%) | | 2.0 |

Ink Preparation

A base ink from the components described in formulation D without the rheological additive was prepared to a tack of approximately 6 measured with an electronic inkometer at 1200 RPM at 90° F. It was then mixed on a high speed disperser at 6000 RPM using Cowles blades (1¼" blade) for 2 minutes or until the ink temperature was between 105°–115° F. The rheological additives of the previous examples were added at either the post add or grind stage and mixed for 10 minutes; Examples A to D (which are comparative examples) were added at the grind stage.

After the inks were made, they were allowed to equilibrate at room temperature overnight, and the ink properties such as NPIRI G-3 grind (indicative of dispersibility), Laray viscosity, Brookfield viscosity and in some instances gloss were measured.

Fineness of grind was measured on a NPIRI Grindometer with G-1 (25 micron) and G-3 (75 micron) grind gauge in accordance with ASTM D1316-87. Inks were noted for background haze and scratches.

Scratches were reported where 4 or more scratches appear. Background hazes were rated following the RHEOX, Inc. Background Haze Rating Scales which ranged from extremely heavy (EXH) to clean (CL). For e.g. 0/10 LM means no scratches, haze becomes continuous at 10 (25 micron on G-3) and is light medium. 3/14M means 4+ scratches appear at 3 and haze becomes continuous at 14 with medium amount of haze.

Falling rod viscosities were measured at 25° C. with a Laray Viscometer, in accordance with ASTM D4040-81. Viscosity and yield value were calculated on a PC at a shear rate of 2500 sec$^{-1}$ and at 2.5 sec$^{-1}$ respectively using a power law calculation.

From viscosity and yield value data the Shortness ratio was calculated as follows:

$$\text{Shortness Ratio} = \frac{\text{Yield Value}}{\text{Laray Viscosity}}$$

Emulsification (water pickup) was measured with a Duke Emulsification tester Model D-10 in accordance with ASTM D4942-89, using a 5 minute Single Point Water Pickup Method.

Gloss was measured using a 60° angle Gardner Glossmeter at different points over the ink print, and these values were averaged.

Tack was measured with a Thwing-Albert Electronic Inkometer, Model 101, in accordance with ASTM D4361-89. Tack reading was taken after one minute at 1200 RPM at 90° F.

Misting was determined by visual observation of the ink collected on a clean 5½"×7" blank white sheet of paper placed under the inkometer rollers during a tack measurement. Misting was then categorized from extremely poor to excellent and was done on a comparative basis versus the blank as follows:

| Rating | |
|---|---|
| EXP | Extremely Poor |
| VP | Very Poor |
| P | Poor |
| P/F | Poor–Fair |
| F | Fair |
| F/G | Fair–Good |
| G | Good |
| E | Excellent |

The results of the tests are set forth in Table 7.

COMPARATIVE EXAMPLE 10

A web offset heatset red ink was prepared according to Procedure 1 without the addition of a rheological additive. The ink properties were evaluated and are set forth in Table 7.

TABLE 7

Results in Mirrex FG-9 Heatset Red System
Loading: 2% Rheological Additive (w/w)

| Example | G-3 Grind | Laray Viscosity [Poise] | Yield Value (dynes/cm$^2$) | Shortness Ratio | Tack (g/meter) | Misting |
|---|---|---|---|---|---|---|
| 2 | 0/6 LM | 59.0 | 803 | 13.6 | 7.1 | F |
| 3 | 0/4 LM | 65.4 | 1,341 | 20.5 | 6.0 | G/E |
| 4 | 0/5 LM | 62.6 | 845 | 13.5 | 6.3 | E |
| 5 | 0/4 LM | 57.3 | 838 | 14.6 | 6.1 | G/E |
| 6 | 0/7 LM | 61.0 | 1,144 | 18.8 | 6.1 | E |
| 7 | 0/6 LM | 51.7 | 444 | 8.6 | 6.2 | F/G |
| 8 | 0/6 LM | 56.4 | 465 | 8.2 | 6.3 | F/G |
| 9 | 0/6 LM | 57.3 | 595 | 10.4 | 6.2 | G |
| 11 | 0/9 LM | 76.2 | 1,634 | 21.0 | 6.6 | F–F/G |
| 12 | 0/6 LM | 70.4 | 1,238 | 17.6 | 6.2 | G |
| 13 | 0/5 LM | 60.4 | 829 | 13.7 | 6.9 | G |
| 14 | 0/6 LM | 61.0 | 1,211 | 22.0 | 5.8 | E |
| COMPARATIVE EXAMPLE A | 0/6 LM | 63.2 | 1,034 | 16.4 | 6.3 | G |
| COMPARATIVE EXAMPLE B | 0/6 LM | 63.3 | 1,035 | 16.4 | 6.3 | E |
| COMPARATIVE EXAMPLE C | 26/30 H | 54.0 | 659 | 12.2 | 5.4 | G |
| COMPARATIVE EXAMPLE D | 0/7 LM | 64.3 | 1,089 | 16.9 | 6.2 | E |
| COMPARATIVE EXAMPLE 10 | 0/5 LM | 49.0 | 391 | 8.0 | 5.9 | F |

As may be seen from the data set forth above, the rheological additives of the present invention described in Examples 2 to 14 are effective ink additives yielding excellent high shear viscosity, yield value and shortness ratio compared to the comparative examples containing no rheological additives or to the solid additives.

Additionally, samples of rheological additives of the present invention were evaluated for G-3 grind, Laray Viscosity, yield value and shortness ratio using the procedure discussed previously in a web offset heatset blue ink. The preparation and components of the web offset heatset blue ink are described in Formulation E.

Rheological additives prepared in accordance with Example 2 set forth above was incorporated into the web offset heatset blue ink and the results are described in Table 8.

COMPARATIVE EXAMPLE 11

A web offset heatset blue ink was prepared from the components described in Formulation E without the addition of a rheological additive. The ink properties were evaluated and are set forth in Table 8.

FORMULATION E

FORMULATION E: WEB OFFSET HEATSET BLUE FORMULA

| Component | Generic Name | Supplier | Weight % |
|---|---|---|---|
| OPTIMIX 1 PHTHALO BLUE 70 PP 0224 | Flush | BASF | 30.7 |
| MIRREX FG-9 XL | Heatset Gel Varnish | LAWTER | 46.1 |
| MAXICOMP 1B 326 | Wax Compound | AMPAC | 4.0 |
| MAGIESOL 52 | Ink Oil | MAGIE BROS. | 17.2 |
| Rheological Additive | (0.5–2.0%) | | 2.0 |

TABLE 8

Results in Mirrex FG-9 Heatset Blue System
Loading: 2% Rheological Additive (w/w)

| Example | G-3 Grind | Laray Viscosity [Poise] | Yield Value (dynes/cm$^2$) | Shortness Ratio | Tack (g/meter) | Misting |
|---|---|---|---|---|---|---|
| 2 | 0/6 LM | 56 | 1,414 | 26.0 | 7.1 | F/G |

TABLE 8-continued

Results in Mirrex FG-9 Heatset Blue System
Loading: 2% Rheological Additive (w/w)

| Example | G-3 Grind | Laray Viscosity [Poise] | Yield Value (dynes/cm$^2$) | Shortness Ratio | Tack (g/meter) | Misting |
|---|---|---|---|---|---|---|
| COMPARATIVE EXAMPLE 11 | 0/5 LM | 53 | 795 | 8.0 | 5.8 | F |

Additionally, samples of rheological additives of the present invention were evaluated for G-3 grind, Laray viscosity, yield value and shortness ratio using the procedure discussed previously in a web offset heatset yellow ink. The preparation and components of the web offset heatset yellow ink are described in Formulation F.

Rheological additives prepared in accordance with Example 2 set forth above was incorporated into the web offset heatset yellow ink and the results are described in Table 9.

COMPARATIVE EXAMPLE 12

A web offset heatset yellow ink was prepared from the components described in Formulation F without the addition of a rheological additive. The ink properties were evaluated and are set forth in Table 9.

Rheological additives prepared in accordance with Example 2 set forth above were incorporated into the web offset heatset black ink and the results are described in Table 10.

COMPARATIVE EXAMPLE 13

A web offset heatset black ink was prepared from the components described in Formulation G without the addition of a rheological additive. The ink properties were evaluated and are set forth in Table 10.

FORMULATION F
FORMULATION F: WEB OFFSET HEATSET YELLOW FORMULA

| Component | Generic Name | Supplier | Weight % |
|---|---|---|---|
| OPTIMIX 1 SICO YELLOW 12 PP 0328 | Flush | BASF | 32.3 |
| MIRREX FG-9 XL | Heatset Gel Varnish | LAWTER | 45.5 |
| MAXICOMP 1B 326 | Wax Compound | AMPAC | 4.0 |
| MAGIESOL 52 | Ink Oil | MAGIE BROS. | 16.2 |
| Rheological Additive | (0.5–2.0%) | | 2.0 |

TABLE 9

Results in Mirrex FG-9 Heatset Yellow System
Loading: 2% Rheological Additive (w/w)

| Example | G-3 Grind | Laray Viscosity [Poise] | Yield Value (dynes/cm$^2$) | Shortness Ratio | Tack (g/meter) | Misting |
|---|---|---|---|---|---|---|
| 2 | 0/10 LM | 60 | 1,265 | 21.0 | 5.6 | F/G |
| COMPARATIVE EXAMPLE 12 | 0/10 LM | 52 | 733 | 14.0 | 5.0 | F |

Additionally, samples of rheological additives of the present invention were evaluated for G-3 grind, Laray viscosity, yield value and shortness ratio using the procedure discussed previously in a web offset heatset black ink. The preparation and components of the web offset heatset yellow ink are described in Formulation G.

FORMULATION G
FORMULATION G: WEB OFFSET HEATSET BLACK FORMULA

| Component | Generic Name | Supplier | Parts |
|---|---|---|---|
| SUPER 36 | Black Base | KERLEY | 36.0 |
| MIRREX FG-9 XL | Heatset Gel Varnish | LAWTER | 40.0 |
| MAXICOMP 1B 326 | Wax Compound | AMPAC | 4.0 |
| MAGIESOL 52 | Ink Oil | MAGIE BROS. | 19.0 |
| SKINNO 2 | Anti-skin | MOONEY | 0.3 |
| Rheological Additive | (0.5–2.0%) | | 2.0 |

TABLE 10

Results in Mirrex FG-9 Heatset Black System
Loading: 2% Rheological Additive (w/w)

| Example | G-3 Grind | Laray Viscosity [Poise] | Yield Value (dynes/cm$^2$) | Shortness Ratio | Tack (g/meter) | Misting |
|---|---|---|---|---|---|---|
| 2 | 0/8 LM | 55 | 520 | 10.0 | 6.4 | F |
| COMPARATIVE EXAMPLE 13 | 0/8 LM | 47 | 347 | 7.4 | 5.7 | F/P |

EXAMPLE 15

To a 250 ml 3-necked round bottomed flask equipped with a thermometer, a mechanical stirrer, a Dean-Stark adaptor, and a nitrogen inlet 46.43 parts Ethomeen 18/25 and 34.02 parts Empol 1004 were charged. The mixture is heated to 200° C. with stirring under a blanket of nitrogen. Water starts to come off at 170° C. and the reaction mixture begins to thicken. After an hour at 200° C., aliquots are taken hourly and the acid and the amine values are determined. When the acid and the amine values are 30 and 37, respectively, 2.38 parts 2-amino-2-ethyl-1,3-propanediol were charged and the reaction continued until the acid value is below 9 and the amine value is below 37. At the end of the reaction, the product is cooled and discharged. The product was cooled to ambient temperature and was liquid.

A rheological additive prepared in accordance with Example 15 set forth above were incorporated into water reducible white gloss enamel paint and the results are described in Table 11.

COMPARATIVE EXAMPLE 14

A water reducible white gloss enamel paint was prepared according to the procedures described in Formulation H without the addition of a rheological additive. The paint properties were evaluated and are set forth in Table 11.

FORMULATION H

| Material | Manufacturer | Parts by weight |
|---|---|---|
| Kelsol 3961-B2G-75 | Reichhold Chemicals, Inc. | 191.7 |
| Active 8 | R. T. Vanderbilt Co. | 1.1 |
| Cobalt Hydrocure II | O. M. Group, Inc. | 5.8 |
| Butyl Cellosolve | Union Carbide | 21.1 |
| Kronos 2101 | Kronos, Inc. | 197.5 |

FORMULATION H

| Material | Manufacturer | Parts by weight |
|---|---|---|
| Disperse @ 5000 RPM for 15 minutes, and then add at slow speed | | |
| Kelsol 3961-B2G-75 | Reichhold Chemicals, Inc. | 71.9 |
| n-Butanol | Ashland Chemical Co. | 21.1 |
| Anmonium Hydroxide 28% | Baker Chemicals | 11.5 |
| Rheological Additive | | 16.6 |
| Deionized Water | | 447.5 |

TABLE 11

Results in Water Reducible White Gloss Enamel System
Loading: 4 pphg

| Example | Stormer (KU) | ICI Cone[1] & Plate | Leneta Sag (mils) |
|---|---|---|---|
| 15 | 76 | 1.8 | 7 |
| COMPARATIVE EXAMPLE 14 | 70 | 1.3 | 5 |

[1]Units in Poise at 10,000 Sec$^{-1}$.

As can be seen from the data set forth above, the liquid rheological additive of the present invention are effective paint additive yielding excellent viscosity results compared to Comparative Example 14 in aqueous systems.

The invention being thus described, it will be obvious that the same may be varied in many ways. However, such variations are not to be regarded as a departure from the spirit and scope of the invention.

What I claim:

1. A liquid rheological additive for liquid organic systems which when free of diluent is pourable at ambient temperature and imparts thixotropy to such systems comprising the reaction product of:

(a) from about 15 to 75 parts by weight of one or more liquid polyalkoxylated nitrogen containing compounds containing more than one hydroxyl group and which also contain a pendant aliphatic radical of 6 to 40 carbon atoms selected from the group consisting of tertiary amines and amides of secondary amines;
(b) from about 8 to 90 parts by weight of one or more polycarboxylic acids; and
(c) from about 0.5 to 20 parts by weight of one or more liquid diamines of a molecular weight of about 2000 or less, wherein the reaction was continued until the acid value was within the range of 5 to 14 and the amine value was within the range of 42 to 84.

2. The liquid rheological additive of claim 1 wherein the liquid diamine is selected from the group consisting of isophorone diamine and amine-terminated poly(propylene glycol)s.

3. The liquid rheological additive of claim 1 wherein one or more of the liquid polyalkoxylated nitrogen containing compounds contains a pendent aliphatic radical having 12 to 18 carbon atoms.

4. The liquid rheological additive of claim 1 wherein the aliphatic radical is branched.

5. The liquid rheological additive of claim 1 dissolved in a diluent.

6. The liquid rheological additive of claim 1 wherein the liquid polyalkoxylated nitrogen containing compound is selected from the group consisting of liquid alkoxylated aliphatic amine diols and liquid alkoxylated aliphatic amide diols.

7. The liquid rheological additive of claim 1 wherein:

(a) is a polyoxyethylene(5)cocoamine;

(b) is a mixture of a hydrogenated dimerized $C_{18}$ unsaturated fatty acid and a hydrogenated trimerized $C_{18}$ unsaturated fatty acid; and (c) is isophorone diamine.

* * * * *